US012435751B2

(12) United States Patent
Kuo et al.

(10) Patent No.: US 12,435,751 B2
(45) Date of Patent: Oct. 7, 2025

(54) ELECTRONIC DEVICE AND HINGE MECHANISM THEREOF

(71) Applicant: Wistron Corporation, New Taipei (TW)

(72) Inventors: Chih-Wei Kuo, New Taipei (TW); Yu-Chun Hung, New Taipei (TW); Che-Yen Chou, New Taipei (TW); Chen-Wei Tsai, New Taipei (TW); Hsiang-Wen Huang, New Taipei (TW)

(73) Assignee: WISTRON CORPORATION, New Taipei (TW)

( * ) Notice: Subject to any disclaimer, the term of this patent is extended or adjusted under 35 U.S.C. 154(b) by 234 days.

(21) Appl. No.: 18/155,278

(22) Filed: Jan. 17, 2023

(65) Prior Publication Data

US 2024/0133421 A1 Apr. 25, 2024
US 2024/0229858 A9 Jul. 11, 2024

(30) Foreign Application Priority Data

Oct. 19, 2022 (TW) .................................. 111139722

(51) Int. Cl.
*G06F 1/16* (2006.01)
*F16C 11/04* (2006.01)
*F16M 11/10* (2006.01)
*F16M 11/22* (2006.01)

(52) U.S. Cl.
CPC ........... *F16C 11/04* (2013.01); *F16M 11/105* (2013.01); *F16M 11/22* (2013.01); *F16M 2200/022* (2013.01)

(58) Field of Classification Search
None
See application file for complete search history.

(56) References Cited

U.S. PATENT DOCUMENTS

| 8,876,074 | B2 | 11/2014 | Chen | |
| 2020/0344439 | A1* | 10/2020 | Choi | ...................... F16M 11/22 |
| 2020/0344902 | A1* | 10/2020 | Choi | ................... F16M 11/105 |
| 2022/0228701 | A1 | 7/2022 | Huang et al. | |

FOREIGN PATENT DOCUMENTS

| CN | 113074182 A | 7/2021 |
| TW | M310570 U | 4/2007 |
| TW | 201514392 A | 4/2015 |

OTHER PUBLICATIONS

Examination report dated Jun. 5, 2023, listed in related Taiwan patent application No. 111139722.

* cited by examiner

Primary Examiner — Imani N Hayman
Assistant Examiner — Rashen E Morrison
(74) Attorney, Agent, or Firm — McClure, Qualey & Rodack, LLP

(57) ABSTRACT

An electronic device includes a monitor stand, a hinge mechanism, and an operation element. The hinge mechanism includes a back plate, a speed reduction assembly, and a friction assembly. The back plate is fixed to the monitor stand. The speed reduction assembly includes an input plate and a speed reduction member. The speed reduction member is arranged on the input plate. The friction assembly is arranged between the back plate and the input plate. The operation element is connected to the speed reduction member. A rotation center of the operation element coincides with an axis of the back plate and the speed reduction member are coaxially arranged.

15 Claims, 9 Drawing Sheets

ELECTRONIC DEVICE AND HINGE MECHANISM THEREOF

CROSS-REFERENCE TO RELATED APPLICATION

This non-provisional application claims priority under 35 U.S.C. § 119(a) to Patent Application No. 111139722 filed in Taiwan, R.O.C. on Oct. 19, 2022, the entire contents of which are hereby incorporated by reference.

BACKGROUND

Technical Field

The present invention relates to an electronic device and a hinge mechanism thereof, and in particular, to an electronic device that can fix a monitor and rotate the monitor through the hinge mechanism and a hinge mechanism thereof.

RELATED ART

With the popularization of digital technology, a computer has gradually become one of the most important items in daily life. Users can process electronic files, analyze data, or enjoy entertainment such as audio and video through computer equipment. Regardless of an integrated computer or a desktop, the computer needs to be connected to a monitor to display electronic information on the monitor for users to view. In order to improve the convenience to read for the user, monitors on the market at present are designed to be rotatable, so that the user can freely rotate the monitor to adjust the direction of a picture displayed on the monitor.

SUMMARY

In view of this, an electronic device is provided, including a monitor stand, a hinge mechanism, and an operation element. The hinge mechanism includes a back plate, a speed reduction assembly, and a friction assembly. The back plate is fixed to the monitor stand. The speed reduction assembly includes an input plate and a speed reduction member. The speed reduction member is arranged on the input plate. The friction assembly is arranged between the back plate and the input plate. The operation element is connected to the speed reduction member. A rotation center of the operation element coincides with an axis of the back plate and the speed reduction member coaxially arranged.

In some embodiments, the speed reduction member has an input end and an output end. The input plate is fixed to the input end, the operation element is fixed to the output end, and the input end is pivotally connected to the back plate.

In some embodiments, a radial distance between the input end and a position where the friction assembly is fixed to one of the back plate and the input plate is greater than a radial distance between the input end and the output end.

In some embodiments, the friction assembly is radially located on an outer side of the speed reduction member.

In some embodiments, the friction assembly includes a fixed surface, a friction surface, and a force application member. The fixed surface is fixed to one of the back plate and the input plate, the friction surface abuts against the other of the back plate and the input plate, and the force application member is located between the input plate and the back plate, so that the friction surface abuts against the one of the back plate and the input plate.

In some embodiments, the friction assembly includes a friction member and a force application member. The friction member has a fixed surface and a friction surface, the force application member is located between the input plate and the friction member, the force application member is a magnet, and the back plate is made of a ferromagnetic material, so that the friction surface abuts against the back plate.

In some embodiments, the friction assembly includes a friction member and a force application member. The friction member has a fixed surface and a friction surface, the force application member is an elastic element (for example, a spring or a reed), one end of the elastic element contacts the friction member, and another end of the elastic element contacts the one of the back plate and the input plate, so that the friction surface abuts against the other of the back plate and the input plate.

In some embodiments, the back plate is provided with a side wall portion that axially extends, the input plate is provided with a positioning post radially extending toward the side wall portion, and the elastic element is sleeved on the positioning post.

In some embodiments, a hinge mechanism is provided, including a back plate, a speed reduction assembly, and a friction assembly. The speed reduction assembly includes an input plate and a speed reduction member. The speed reduction member has an input end and an output end. The input plate is fixed to the input end, and the input end is pivotally connected to the back plate. The friction assembly has a fixed surface and a friction surface. The fixed surface is fixed to the one of the back plate and the input plate, and the friction surface abuts against the other of the back plate and the input plate. A radial distance between the input end and a position where the friction assembly is fixed to one of the back plate and the input plate is greater than a radial distance between the input end and the output end.

In some embodiments, the speed reduction member is a planetary gear train and includes a sun gear, a planetary gear set, and a ring gear, the planetary gear set meshes between the sun gear and the ring gear, the sun gear is connected to the input end, and the ring gear is connected to the output end.

In some embodiments, the planetary gear set includes a first gear, a second gear, and a third gear, and the first gear, the second gear, and the third gear respectively mesh between the sun gear and the ring gear.

In some embodiments, a hinge mechanism is provided, including a back plate, a speed reduction assembly, and a friction assembly. The speed reduction assembly includes an input plate and a speed reduction member. The speed reduction member has an input end and an output end. The input plate is arranged at the input end, and the input end is pivotally connected to the back plate. The friction assembly is arranged on one of the back plate or the input plate, and the friction assembly abuts against the other of the back plate or the input plate.

In some embodiments, an end of the force application member is fixed to one of the back plate or the input plate, so that the force application member holds the back plate and the input plate.

Various embodiments are described in detail below. However, the embodiments are merely used as examples for description and do not limit or reduce the protection scope of the present invention. In addition, some elements are omitted in the drawings in the embodiments to clearly show the technical features of the present invention. The same reference numeral is used to indicate the same or similar elements in all of the drawings.

DETAILED DESCRIPTION

Figure 1:
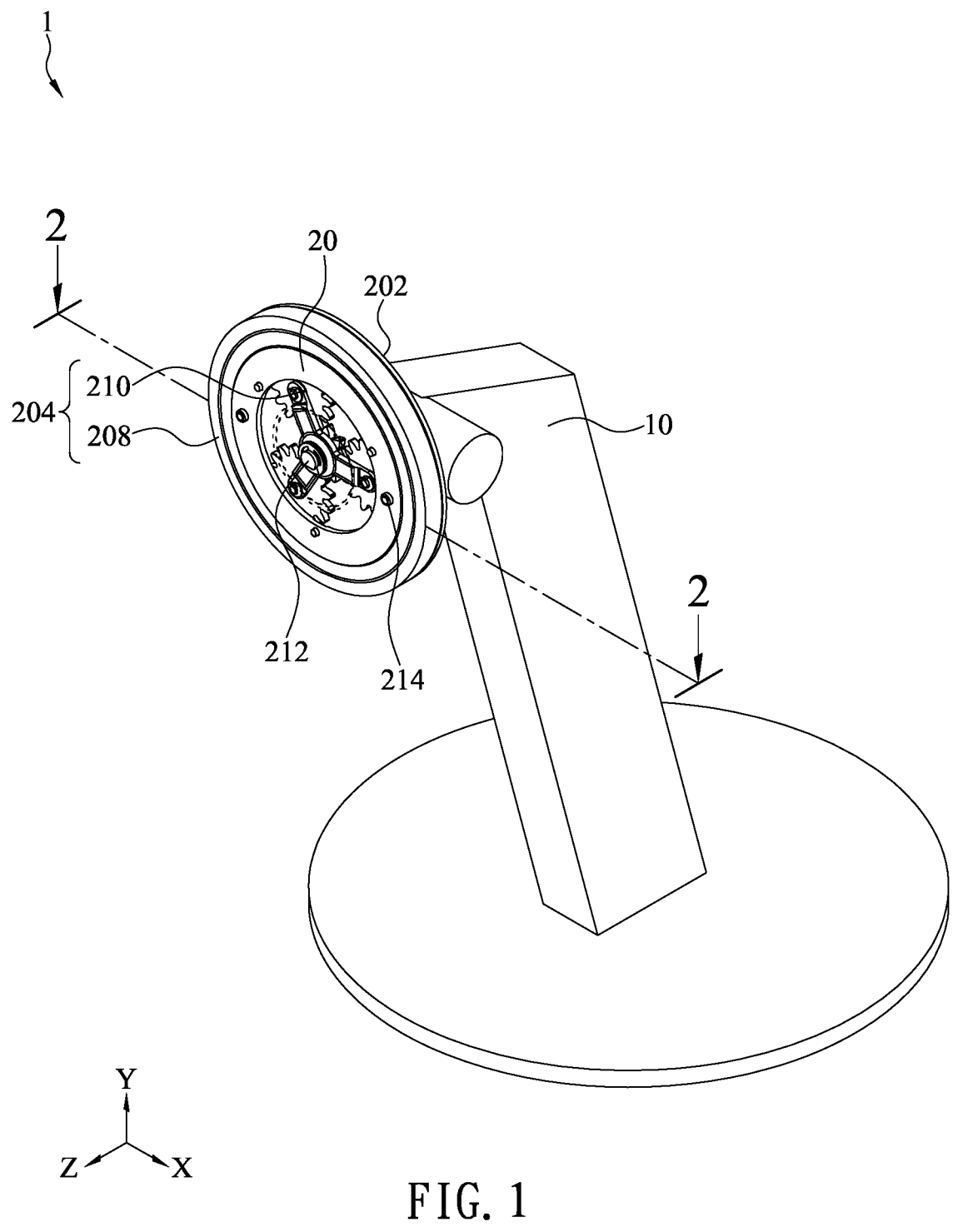
FIG. 1 is a three-dimensional view of an electronic device according to some embodiments of the present invention.
Figure 2:
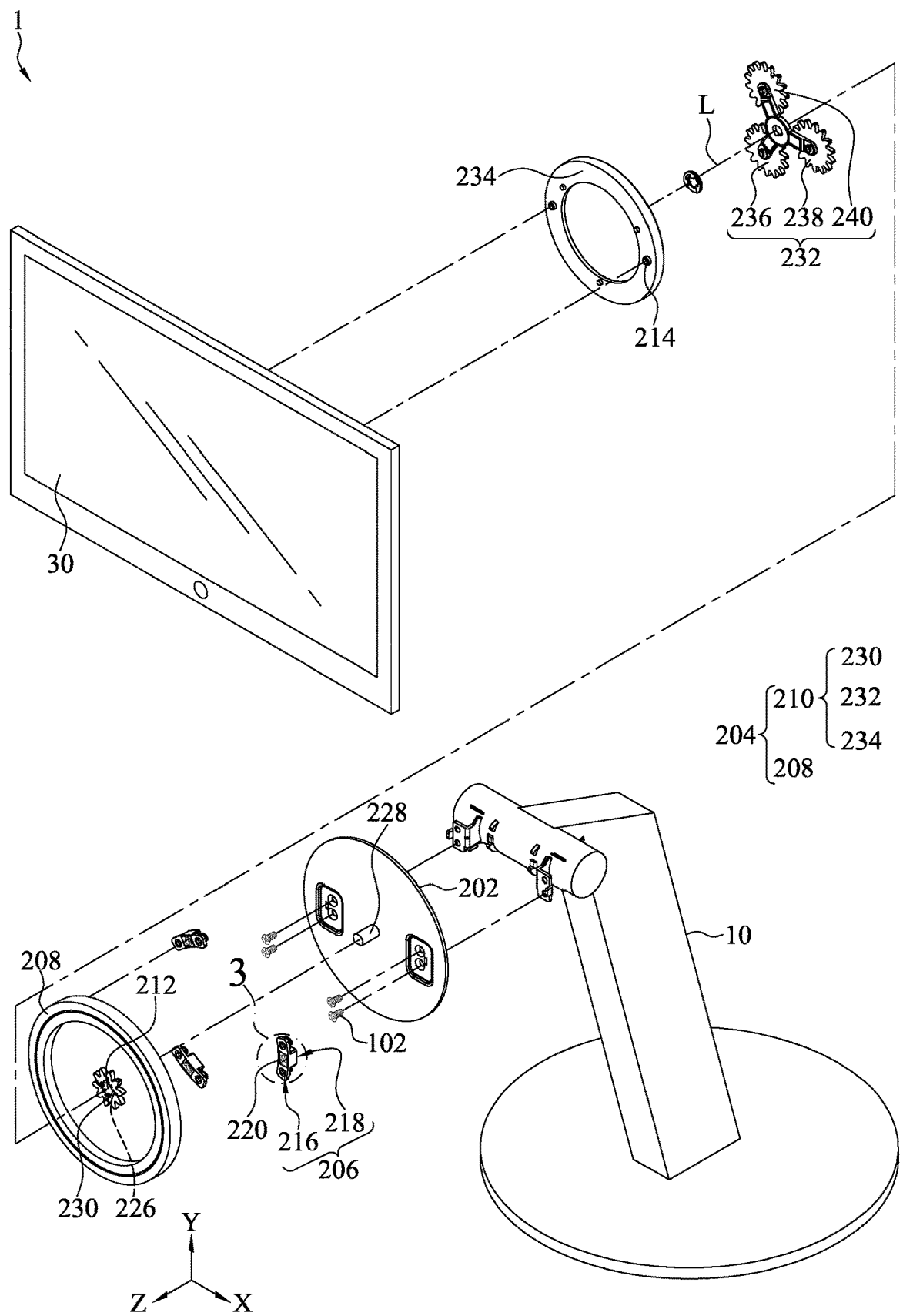
FIG. 2 is an exploded view of an electronic device according to some embodiments of the present invention.
Figure 3:
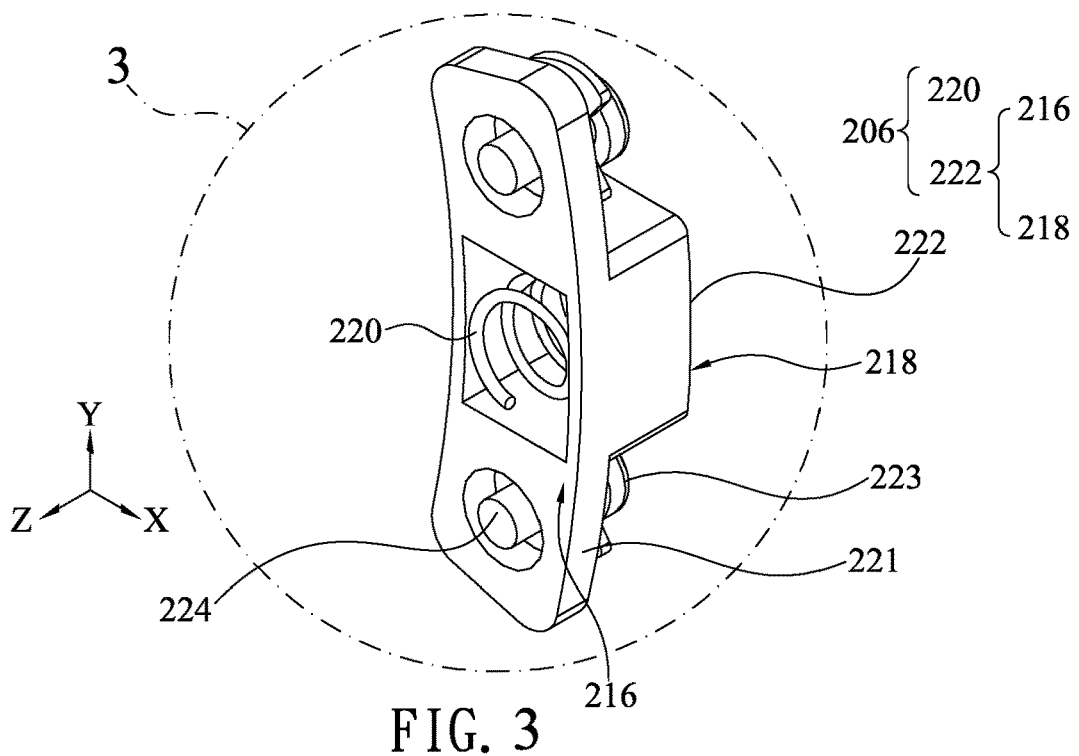
FIG. 3 is an enlarged view of a friction assembly in an area 3 marked in FIG. 2.

Refer to FIG. 1, FIG. 2, and FIG. 3. FIG. 1 is a three-dimensional view of an electronic device according to some embodiments of the present invention. FIG. 2 is an exploded view of an electronic device according to some embodiments of the present invention. FIG. 3 is an enlarged view of a friction assembly in an area 3 marked in FIG. 2. As shown in FIG. 1 to FIG. 3, the electronic device 1 includes a monitor stand 10, a hinge mechanism 20, and an operation element 30. The hinge mechanism 20 includes a back plate 202, a speed reduction assembly 204, and a friction assembly 206. The back plate 202 is fixed to the monitor stand 10. The speed reduction assembly 204 includes an input plate 208 and a speed reduction member 210. The speed reduction member 210 is arranged on the input plate 208. The friction assembly 206 is arranged between the back plate 202 and the input plate 208. The operation element 30 is connected to the speed reduction member 210. A rotation center C (shown in FIG. 5) of the operation element 30 coincides with an axis L (detailed later and shown in FIG. 2) of the back plate 202 and the speed reduction member 210 coaxially arranged.

In some embodiments, the speed reduction member 210 has an input end 212 and an output end 214. The input plate 208 is fixed to the input end 212, the operation element 30 is fixed to the output end 214, and the input end 212 is pivotally connected to the back plate 202. The input end 212 is pivotally connected to the back plate 202 and has the axis L, and the rotation center C coincides with the axis L of the back plate 202 and the input end 212 coaxially arranged.

In some embodiments, the friction assembly 206 can be fixed to the back plate 202 or the input plate 208, a radial distance exists between the input end 212 and a position where the friction assembly 206 is fixed to the back plate 202 or the input plate 208. The friction assembly 206 obtains a torque according to an acting force and the radial distance, and the speed reduction member 210 is used for amplifying the torque (detailed later).

Figure 5:
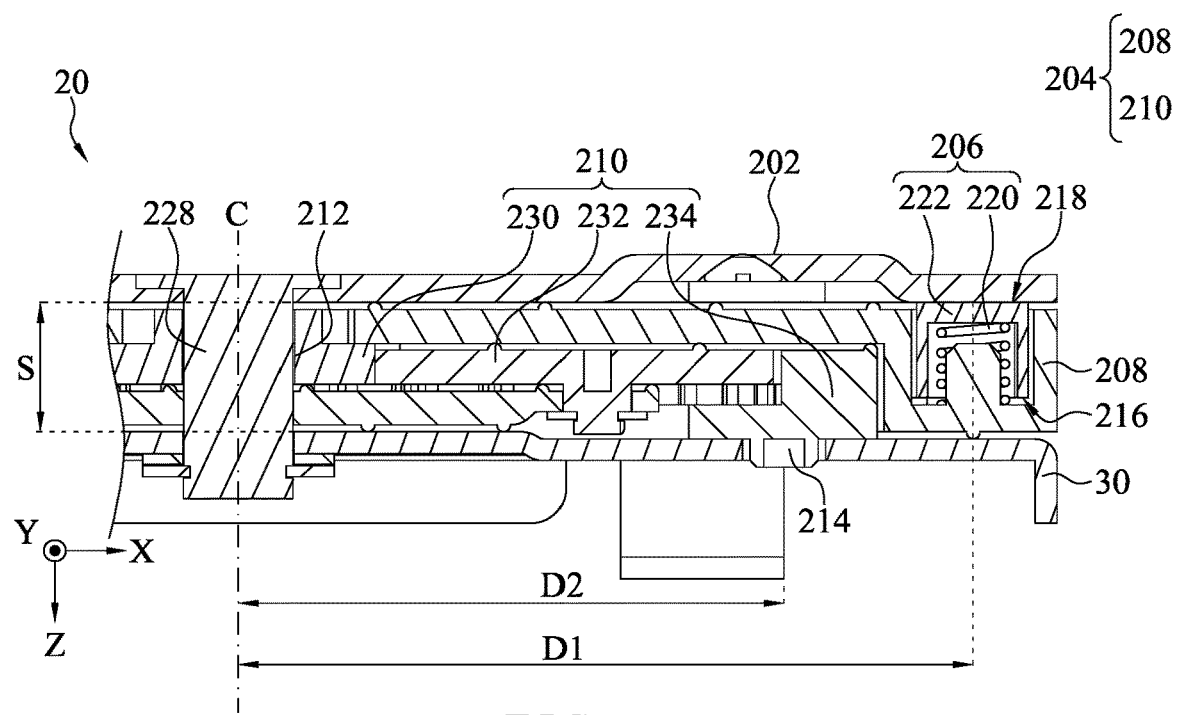
FIG. 5 is a partial cross-sectional view of the hinge mechanism in FIG. 1 at a position 2-2, showing relative positions of a friction assembly and a sun gear.
Figure 5A:
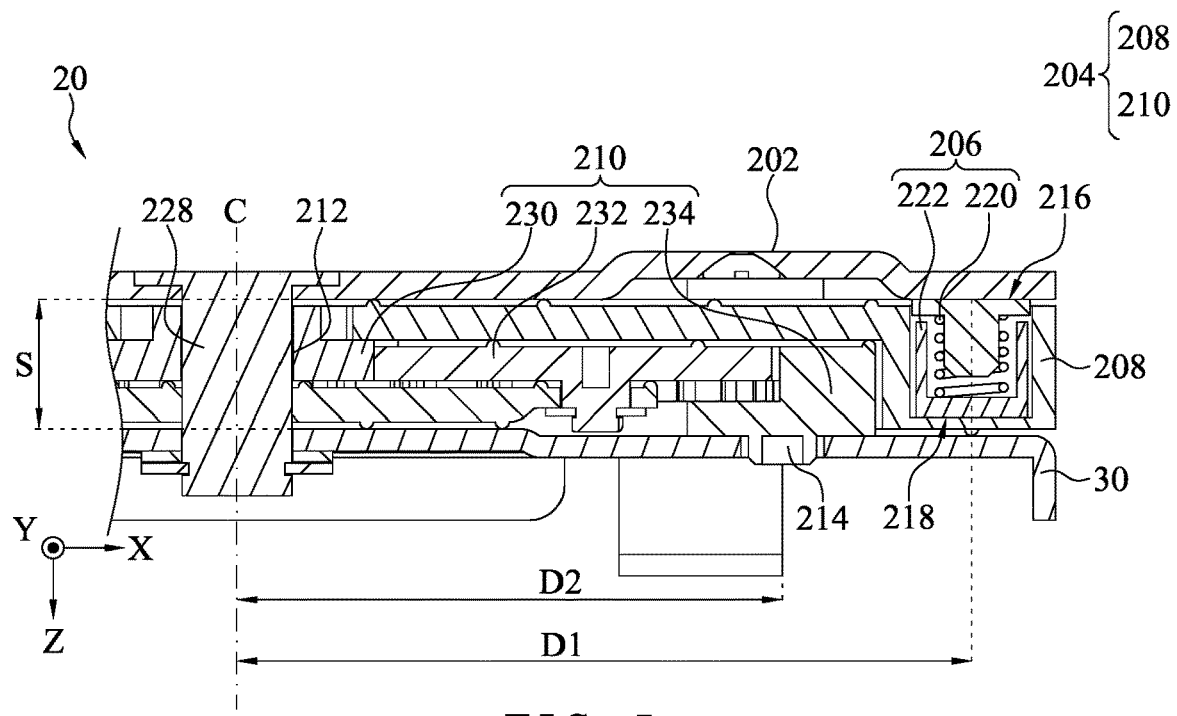
FIG. 5a is other embodiments of the FIG. 5, showing a friction assembly is fixed to a back plate.

Refer to FIG. 3, FIG. 5, and FIG. 5a. FIG. 5, and FIG. 5a. FIG. 5 is a partial cross-sectional view of the hinge mechanism in FIG. 1 at a position 2-2, showing relative positions of a friction assembly and a sun gear. FIG. 5a is other embodiments of the FIG. 5, showing a friction assembly is fixed to a back plate. The monitor stand 10 is omitted in FIG. 5 and FIG. 5a, and the operation element 30 in FIG. 5 and FIG. 5a is a monitor assembly frame. In some embodiments, as shown in FIG. 3, FIG. 5, and FIG. 5a, the friction assembly 206 includes a fixed surface 216, a friction surface 218, and a force application member 220. The force application member 220 is located between the back plate 202 and the input plate 208, so that the friction surface 218 abuts against one of the back plate 202 and the input plate 208. In some embodiments, the friction assembly 206 further includes a friction member 222. The friction member 222 has the fixed surface 216 and the friction surface 218. The force application member 220 being located between the back plate 202 and the input plate 208, so that the friction surface 218 abuts against the one of the back plate 202 and the input plate 208 may mean that one end of the force application member 220 contacts the friction member 222, and another end of the force application member 220 contacts the one of the back plate 202 and the input plate 208. The force application member 220 can continuously apply a force to the friction member 222, so that the friction surface 218 of the friction member 222 can abut against the back plate 202 or the input plate 208. The friction member 222 is fixed to the input plate 208 by way of example in FIG. 5. In this embodiment, the friction member 222 is fixed to the input plate 208 in such a way that the friction member 222 can be movably fixed in an axial direction (a Z axis in FIG. 5) of the speed reduction assembly 204 (detailed later). The force application member 220 is located between the input plate 208 and the friction member 222, so that two ends of the force application member 220 respectively contact the input plate 208 and the friction member 222. In some embodiments, the force application member 220 is an elastic element (a spring or a reed), and when the friction assembly 206 is assembled, the spring is in a compressed state. Therefore, the friction member 222 can move in the axial direction of the speed reduction assembly 204, and the force application member 220 can cause the friction surface 218 of the friction assembly 206 to abut against the back plate 202. With this design, the friction assembly 206 can generate a frictional force between the back plate 202 and the input plate 208, thereby avoiding the rotation of the speed reduction assembly 204. That is to say, when a torque generated by the output end 214 of the speed reduction assembly 204 (referred to as a second torque below) is less than a torque generated by the frictional force (referred to as a first torque below), the hinge mechanism 20 will not be driven into rotation. On the contrary, the hinge mechanism 20 will rotate in the direction of the second torque.

In some embodiments, the force application member 220 being located between the back plate 202 and the input plate 208, so that the friction surface 218 abuts against the one of the back plate 202 and the input plate 208 may also mean that the force application member 220 is located between the back plate 202 and the friction member 222, so that two ends of the force application member 220 respectively contact the back plate 202 and the friction member 222. The friction member 222 is fixed to the back plate 202 by way of example in FIG. 5a. The fixed surface 216 of the friction member 222 is fixed to the back plate 202, and the friction surface 218 of the friction member 222 abuts against the input plate 208. This implementation can also achieve the purpose that the hinge mechanism 20 will not be driven into rotation when the second torque generated by the output end 214 of the speed reduction assembly 204 is less than the first torque generated by the frictional force (detailed later).

In some embodiments, the friction assembly 206 may be a reed, and two ends of the reed are respectively provided with a fixed surface 216 and a friction surface 218. The fixed surface 216 and the friction surface 218 respectively contact the input plate 208 and the back plate 202. This design can also achieve the purpose that the hinge mechanism 20 will not be driven into rotation when the torque generated by the output end 214 of the speed reduction assembly 204 is less than the torque generated by the frictional force (detailed later in FIG. 6).

For the manner in which the friction member 222 is fixed to the input plate 208, reference is made to FIG. 2, FIG. 3, FIG. 5, and FIG. 5a again. In some embodiments, as shown in FIG. 5. the friction member 222 is fixed to the input plate 208 by a fixing member 224. The fixing member 224 limits the displacement of the friction member 222 in X-axis and Y-axis directions of FIG. 3, but provides a displacement margin of a predetermined distance in a Z-axis direction. The fixing member 224 may be, for example, a stud or a rivet. As shown in FIG. 3, the fixing member 224 is a stud by way of example. After the fixing member 224 locks a lug portion 221 of the friction member 222 to the input plate 208, a distance between a head 223 of the fixing member 224 and the input plate 208 is greater than a thickness (a thickness in the Z-axis direction of FIG. 3) of the lug portion 221 of the friction member 222. In this way, the friction member 222 has a displacement margin of a predetermined distance in the Z-axis direction, which ensures that the friction member 222 can be pushed by the force application member 220, so that the friction surface 218 of the friction member 222 normally abuts against the back plate 202. In some embodiments, as shown in FIG. 5a, the friction member 222 is fixed to the back plate 202 by the fixing member 224. After the fixing member 224 locks the lug portion 221 of the friction member 222 to the back plate 202, a distance between the head 223 of the fixing member 224 and the back plate 202 is greater than the thickness (the thickness in the Z-axis direction of FIG. 3) of the lug portion 221 of the friction member 222. In this way, the friction member 222 can be pushed by the force application member 220, so that the friction surface 218 of the friction member 222 abuts against the input plate 208.

Figure 4:
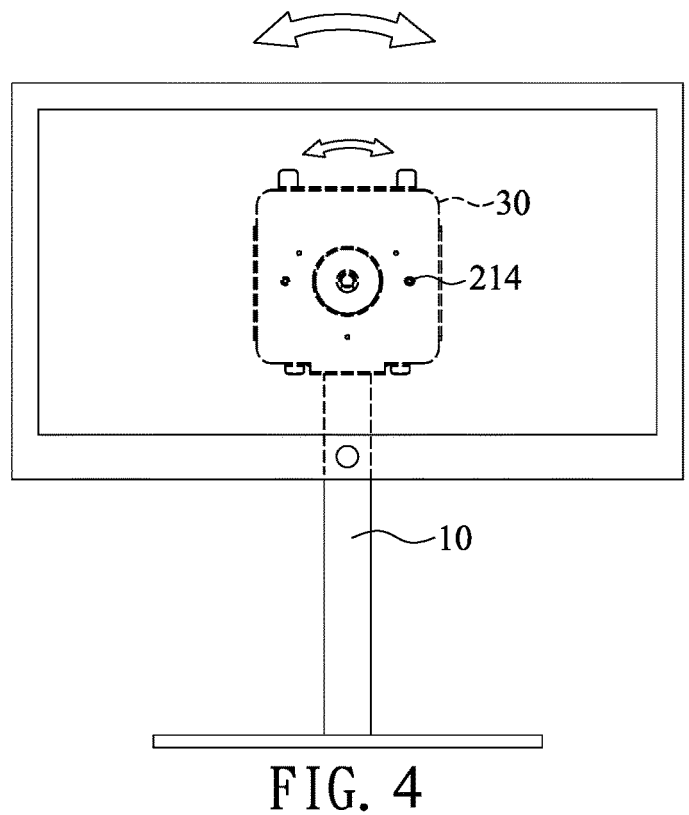
FIG. 4 is an action diagram of a monitor rotating relative to a monitor stand according to some embodiments of the present invention.

Refer to FIG. 1 to FIG. 4 together. FIG. 4 is an action diagram of a monitor rotating relative to a monitor stand according to some embodiments of the present invention. As shown in FIG. 1 to FIG. 4, the operation element 30 may be, for example, a monitor, a monitor assembly frame, or a combination of the monitor and the monitor assembly frame. When the operation element 30 is a monitor, the monitor stand 10 is directly assembled to the monitor. It is to be noted that the operation element 30 is a combination of the monitor and the monitor assembly frame by way of example in FIG. 4. The back plate 202 may be locked to the monitor stand 10 by a locking member 102, and the operation element 30 is fixed to the output end 214 of the speed reduction assembly 204, so that the operation element 30 may be assembled to the monitor stand 10 through the speed reduction assembly 204. When the operation element 30 drives the speed reduction assembly 204, the speed reduction assembly 204 can reduce a rotational speed of the operation element 30 and amplify the torque between the friction assembly 206 and the back plate 202 or the input plate 208, so that a user needs to apply an appropriate force to smoothly rotate the operation element 30 (detailed later). In some embodiments, the operation element 30 is the monitor by way of example in FIG. 4. A vertical distance (a distance along the Y axis in FIG. 4) from the rotation center C of the monitor to a bottom surface of the monitor stand 10 is greater than half of the longest diagonal of the monitor, so that the monitor can smoothly rotate relative to the monitor stand 10 without colliding with the desktop when being fixed at the output end 214. In the embodiment of FIG. 2, the speed reduction assembly 204 includes a planetary gear assembly (a speed reduction member 210). Therefore, a rotation angle of the operation element 30 is 360 degrees, so that the user may rotate the operation element 30 to any angle according to use requirements, and the speed reduction member 210 may also maintain the operation element 30 at the selected angle.

In some embodiments, the input plate 208 has a fixing portion 226 (see FIG. 2). The input plate 208 is fixed to the input end 212 by the fixing portion 226, so that the input plate 208 and the input end 212 are immobile relative to each other. The input end 212 and a fixed shaft 228 of the back plate 202 are rotatable relative to each other. That is, the input end and the fixed shaft are pivotally connected, so that the input plate 208 and the back plate 202 are also rotatable relative to each other (detailed later). In some embodiments, the operation element 30 is fixed to the output end 214, and the connection relationship between the operation element 30 and the output end 214 is immobile relative to each other. In this way, the input plate 208 and the operation element 30 are rotatable relative to each other. The fixing portion 226 may be a fixing hole or a locking hole.

In some embodiments, when the operation element 30 is rotated, the output end 214 of the speed reduction member 210 drives the input end 212. The operation element 30 may drive the output end 214, and the input end 212 may drive the input plate 208, so that the input plate 208 rotates relative to the back plate 202. During the rotation of the input plate 208, the friction surface 218 can continuously abut against the back plate 202 or the input plate 208. The friction assembly 206 causes the friction surface 218 to abut against the back plate 202 or the input plate 208 through an elastic force or a magnetic force (detailed later).

Refer to FIG. 1 to FIG. 5a. As shown in FIG. 1 to FIG. 5a, the input end 212 to the position where the friction assembly 206 is fixed to the back plate 202 or the input plate 208 may mean that a position where the fixed surface 216 is fixed to the back plate 202 or the input plate 208 (refer to FIG. 5 and FIG. 5a), and a radial distance from a central point of the fixed surface 216 to a central point of the input end 212 may be referred to as a first radial distance D1. In addition, a radial distance from a side edge of the output end 214 to the central point of the input end 212 may be referred to as a second radial distance D2.

As shown in FIG. 5 and FIG. 5a again, in some embodiments, the input end 212 coincides with the rotation center C, so that a maximum arm of force exists between the fixed surface 216 in a fixed position and the input end 212. The torque generated by the friction assembly 206 according to the first radial distance D1 and the acting force (such as the frictional force) may be referred to as the first torque. The torque generated by the operation element 30 (the operation element 30 is the monitor assembly frame in FIG. 5 and FIG. 5a) according to the second radial distance D2 and another acting force (a force applied to the monitor or the monitor assembly frame) may be referred to as a second torque. It is to be noted that when the operation element 30 is a combination of the monitor assembly frame and the monitor, the second radial distance D2 may be a distance from the diagonal of the monitor to the central point of the input end 212. When the second torque is less than or equal to the first torque, the operation element 30 is positioned by the speed reduction assembly 204 and the friction assembly 206, so that the back plate 202 and the operation element 30 are immobile relative to each other. On the contrary, when the second torque is greater than the first torque, the back plate 202 can rotate in the direction of the second torque relative to the operation element 30. In some embodiments, increasing a number of friction assemblies 206 can increase the first torque of each of the friction assemblies 206 to the back plate 202 or the input plate 208, so as to increase the sense of damping when the operation element 30 is pushed. Furthermore, the speed reduction member 210 can amplify the first torque (for example, the frictional force), so that the first torque can be greater than the second torque, so as to prevent the operation element 30 from rotating or stopping at any angle (detailed later).

In some embodiments, the number of friction assemblies 206 may be greater than one (for example, three friction assemblies 206 are shown in FIG. 2). On the premise that the frictional force generated by each of the friction assemblies 206 is the same, increasing the number of friction assemblies 206 can increase the first torque. In some embodiments, the frictional force generated by the each friction assembly 206 may be different. In addition, the first radial distance D1 of the each friction assembly 206 may also be different, which means that the radial distance between the each friction assembly 206 and the input end 212 may be the same or different.

As shown in FIG. 5 or FIG. 5a again, in some embodiments, the friction assembly 206 is substantially coplanar with the speed reduction member 210 mean that the friction assembly 206 and the speed reduction member 210 are located between the back plate 202 and the input plate 208, the speed reduction member 210 and one of the fixed surface 216 and the friction surface 218 are located on the input plate 208. One of the fixed surface 216 and the friction surface 218 is substantially coplanar with the speed reduction member 210 at the input plate 208. As shown in FIG. 5 or FIG. 5a, the friction assembly 206 is radially located on an outer side of the speed reduction member 210 may mean that the friction assembly 206 is from away the speed reduction member 210 along the X axis direction in FIG. 5 or FIG. 5a. In this way, a thickness of the friction assembly 206 can be designed according to a thickness S of the speed reduction member 210, so that the hinge mechanism 20 can be designed to be light and thin, and a thickness of the hinge mechanism 20 can be close to the thickness of the speed reduction member 210.

In some embodiments, as shown in FIG. 2, the speed reduction member 210 is a planetary gear train and includes a sun gear 230, a planetary gear set 232, and a ring gear 234. The planetary gear set 232 meshes between the sun gear 230 and the ring gear 234, and the sun gear 230 is fixed to the input end 212, both of which may be an integrally formed element. Alternatively, the input end 212 is a central axis of the sun gear 230, and the input end 212 is pivotally connected to the fixed shaft 228. The ring gear 234 is connected to the output end 214. In this embodiment, the output end 214 is fixed to the ring gear 234. During operation of the speed reduction member 210, the operation element 30 and the ring gear 234 are immobile relative to each other. When the operation element 30 is rotated, the operation element 30 can drive the ring gear 234 to rotate, the ring gear 234 drives the planetary gear set 232 to rotate, and then the planetary gear set 232 drives the sun gear 230 to rotate, so that the back plate 202 rotates synchronously with the sun gear 230. The sun gear 230 and the ring gear 234 have a speed ratio, so that a speed reduction effect can be generated between the sun gear 230 and the ring gear 234, and the speed reduction member 210 can amplify the first torque according to a speed reduction ratio. In some embodiments, as shown in Table I below, the torque is directly proportional to a pitch diameter of the gear and inversely proportional to the rotational speed. For example, when the speed ratio of the sun gear 230 to the ring gear 234 is 1:4, the torque obtained by the sun gear 230 is 10.5 (kilogram-centimeter), and the torque obtained by the ring gear 234 is 42 (kilogram-centimeter). The rotational speed of the sun gear 230 is 240 rpm, and the rotational speed of the ring gear 234 is 60 rpm. A pitch diameter of the sun gear 230 is 20 mm, and a pitch diameter of the ring gear 234 is 80 mm. Therefore, during implementation, an appropriate tooth number ratio (a speed reduction ratio) of the sun gear 230 and the ring gear 234, the first radial distance D1 (refer to FIG. 5 or FIG. 5a), the second radial distance D2 (refer to FIG. 5 or FIG. 5a), and the frictional force may be designed to obtain the positioning effect of the operation element 30 and the force required by the user to rotate the operation element 30.

TABLE I

|  | Speed ratio | Pitch diameter (millimeter) | Rotational speed (revolutions per minute rpm) | Torque (kilogram-centimeter) |
| --- | --- | --- | --- | --- |
| Sun gear | 1 | 20 | 240 | 10.5 |
| Planetary gear set | 1.5 | 30 | 160 | 15.75 |
| Ring gear | 4 | 80 | 60 | 42 |

In some embodiments, as shown in FIG. 2, the planetary gear set 232 includes a first gear 236, a second gear 238, and a third gear 240. The first gear 236, the second gear 238, and the third gear 240 respectively mesh between the sun gear 230 and the ring gear 234. A larger number of gears in the planetary gear set 232 (which may be the first gear 236, the second gear 238, and the third gear 240) leads to larger load bearing capacity of the speed reduction member 210.

In some embodiments, the sun gear 230 may be made of metal, and the planetary gear set 232 and the ring gear 234 may be made of plastic. Therefore, the planetary gear set 232 and the ring gear 234 have high toughness and wear resistance, and the sun gear 230 and the planetary gear set 232 are less likely to form fatigue spalling during meshing with each other and rotation, so as to increase the service life of the speed reduction member 210.

Figure 6:
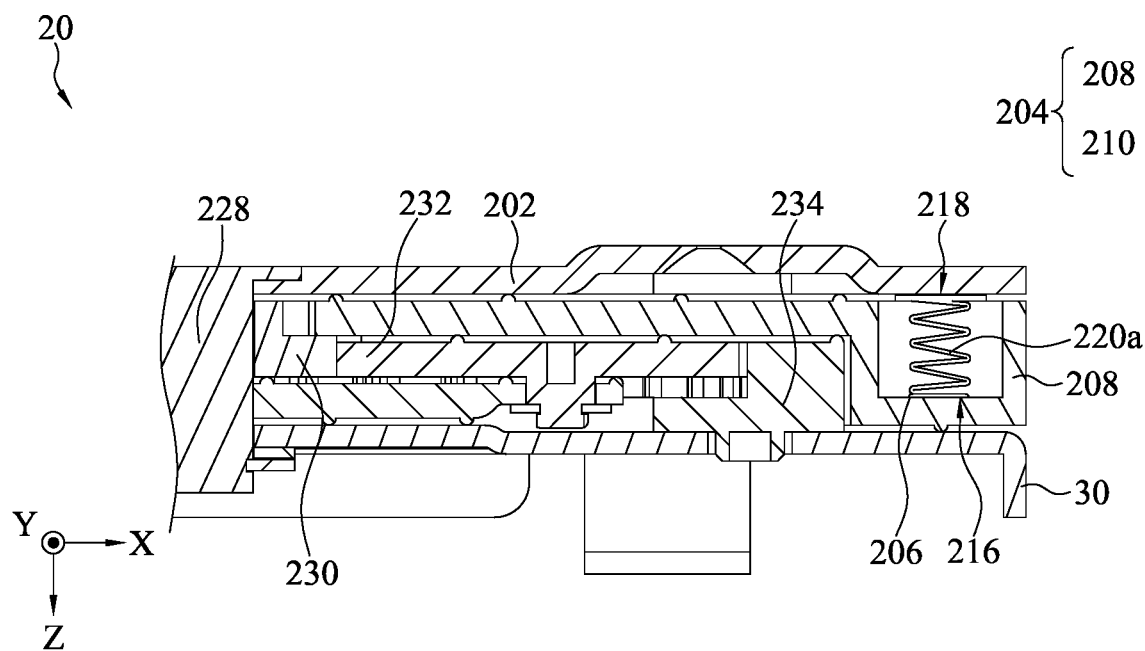
FIG. 6 is a partial cross-sectional view corresponding to a position in FIG. 5 according to some embodiments of the present invention, showing an embodiment in which a force application member is a spring.
Figure 6A:
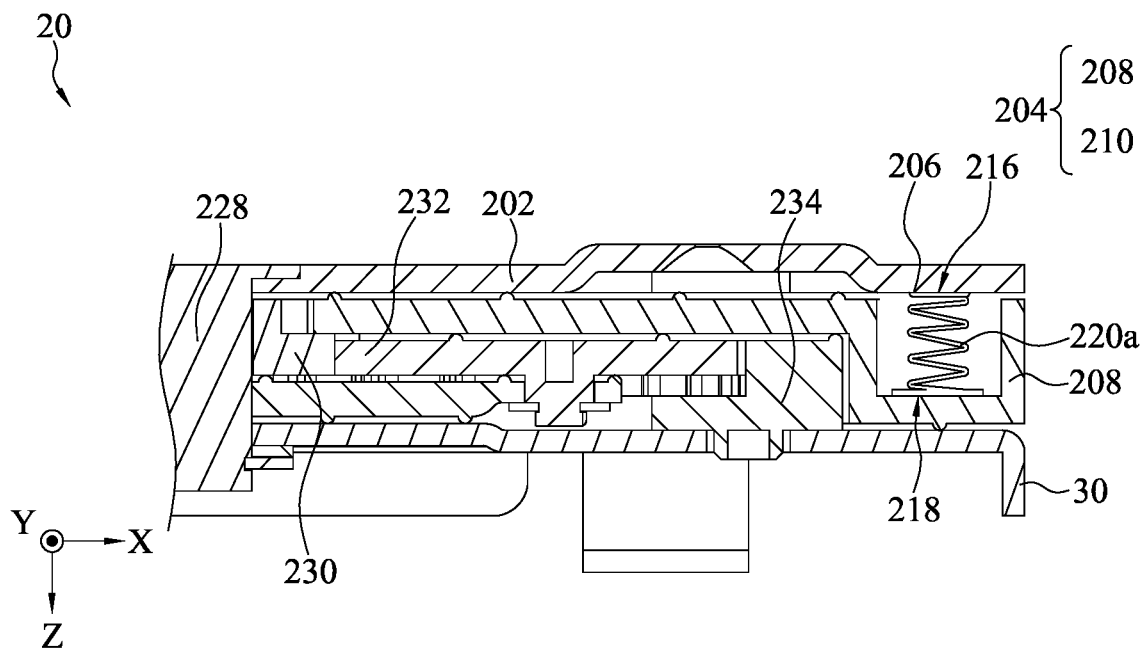
FIG. 6a is other embodiments of the FIG. 6, showing a friction assembly is fixed to a back plate.

Referring to FIG. 6 and FIG. 6a together, FIG. 6 is a partial cross-sectional view corresponding to a position in FIG. 5 according to some embodiments of the present invention, showing an embodiment in which a force application member is a spring. FIG. 6a is other embodiments of the FIG. 6, showing a friction assembly is fixed to a back plate. The monitor stand 10 is omitted in FIG. 6 and FIG. 6a, and the operation element 30 in FIG. 6 is a monitor assembly frame. In some embodiments, as shown in FIG. 5, FIG. 6, and FIG. 6a, the friction member 222 may be omitted from the friction assembly 206 (see FIG. 2). The force application member 220 may be a spring 220a. The spring 220a has the fixed surface 216 and the friction surface 218. In some embodiments, the friction assembly 206 is fixed to the input plate 208 by way of example in FIG. 6. The spring 220a is located between the back plate 202 and the input plate 208. The fixed surface 216 of the spring 220a contacts the input plate 208, and the friction surface 218 contacts the back plate 202. When the spring 220a assembles the friction assembly 206, the spring 220a is in a compressed state, so that the friction surface 218 of the friction assembly 206 abuts against the back plate 202. In some embodiments, the friction assembly 206 is fixed to the back plate 202 by way of example in FIG. 6a. The fixed surface 216 of the spring 220a contacts the back plate 202, and the friction surface 218 contacts the input plate 208. The friction surface 218 of the spring 220a may push the input plate 208, so that the friction surface 218 of the friction assembly 206 abuts against the input plate 208.

Figure 7:
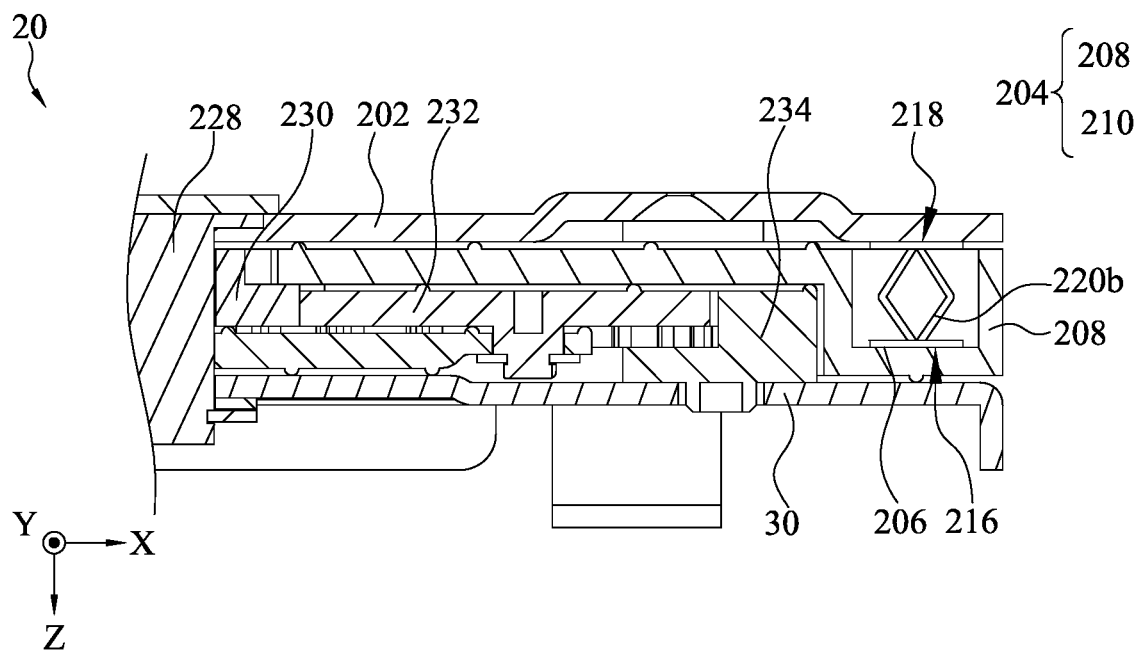
FIG. 7 is a partial cross-sectional view corresponding to a position in FIG. 5 according to some embodiments of the present invention, showing an embodiment in which a force application member is a reed.
Figure 7A:
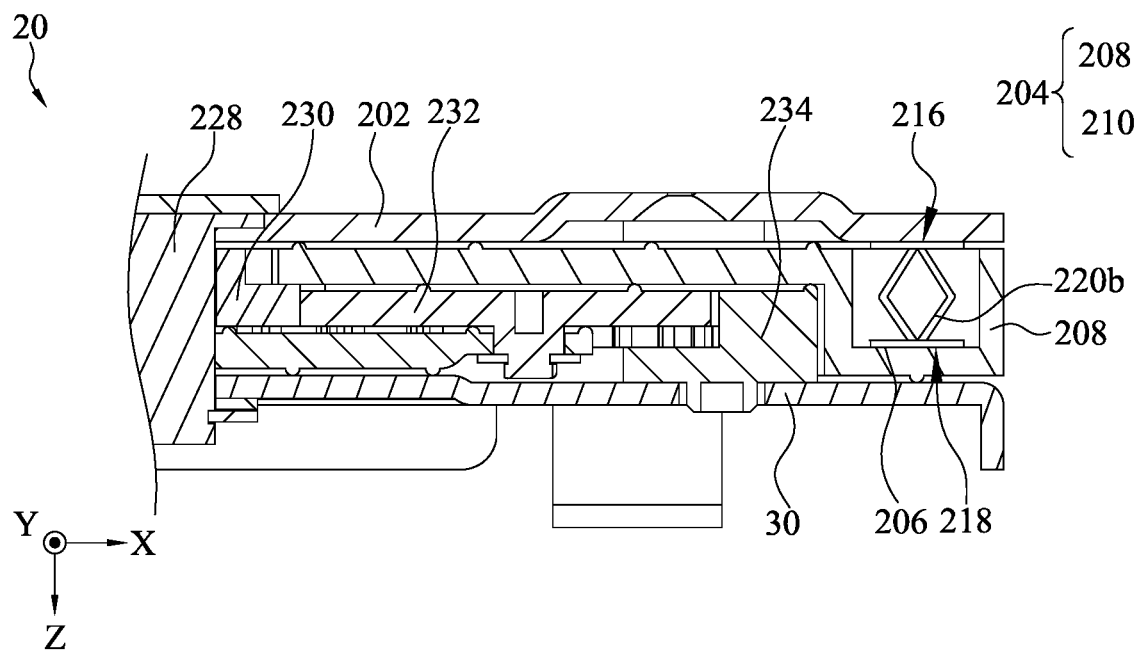
FIG. 7a is other embodiments of the FIG. 7, showing a friction assembly is fixed to a back plate.

Referring to FIG. 7 and FIG. 7a together, FIG. 7 is a partial cross-sectional view corresponding to a position in FIG. 5 according to some embodiments of the present invention, showing an embodiment in which a force application member is a reed. FIG. 7a is other embodiments of the FIG. 7, showing a friction assembly is fixed to a back plate. The monitor stand 10 is omitted in FIG. 7 and FIG. 7a, and the operation element 30 in FIG. 7 and FIG. 7a is a monitor assembly frame. In some embodiments, as shown in FIG. 5, FIG. 7, and FIG. 7a, the friction member 222 may be omitted from the friction assembly 206 (see FIG. 2). The force application member 220 may be a reed 220b. The reed 220b has the fixed surface 216 and the friction surface 218. The friction assembly 206 is fixed to the input plate 208 by way of example in FIG. 7. The reed 220b is located between the back plate 202 and the input plate 208. The fixed surface 216 of the reed 220b contacts the input plate 208, and the friction surface 218 contacts the back plate 202. When the reed 220b assembles the friction assembly 206, the reed 220b is in a compressed state, and the friction surface 218 of the reed 220b may push against the back plate 202, so that the friction surface 218 of the friction assembly 206 abuts against the back plate 202. The friction assembly 206 is fixed to the back plate 202 by way of example in FIG. 7a. The fixed surface 216 of the reed 220b contacts the back plate 202, and the friction surface 218 contacts the input plate 208. The friction surface 218 of the reed 220b may push the input plate 208, so that the friction surface 218 of the friction assembly 206 abuts against the input plate 208.

Figure 8:
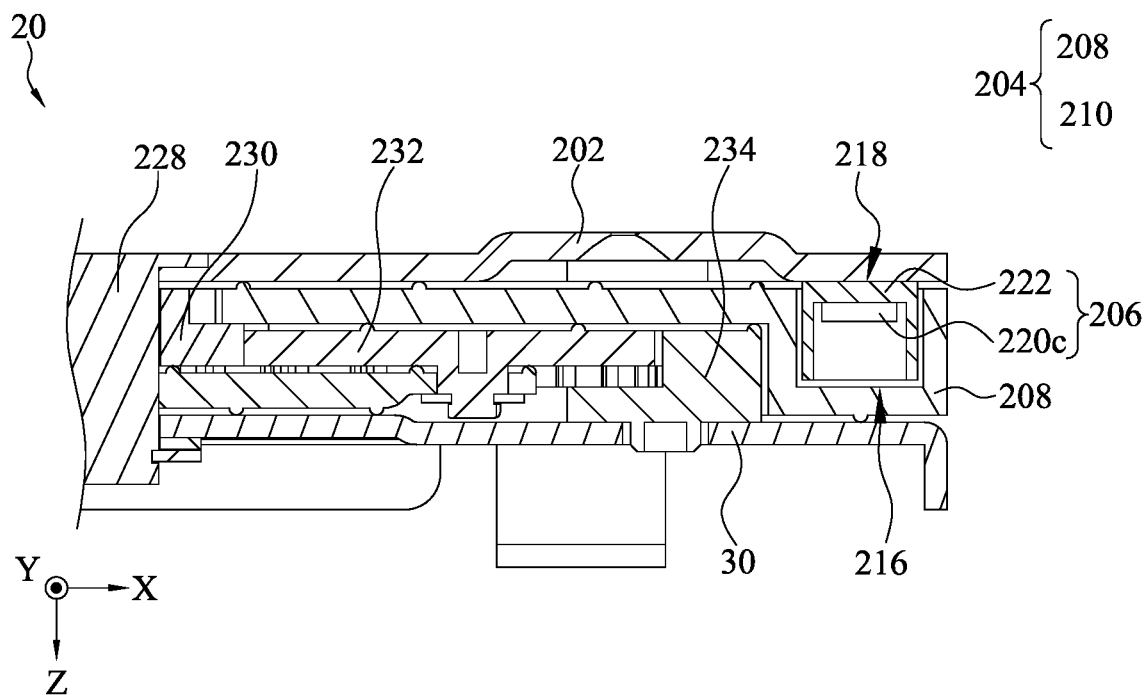
FIG. 8 is a partial cross-sectional view corresponding to a position in FIG. 5 according to some embodiments of the present invention, showing an embodiment in which a force application member is a magnet.
Figure 8A:
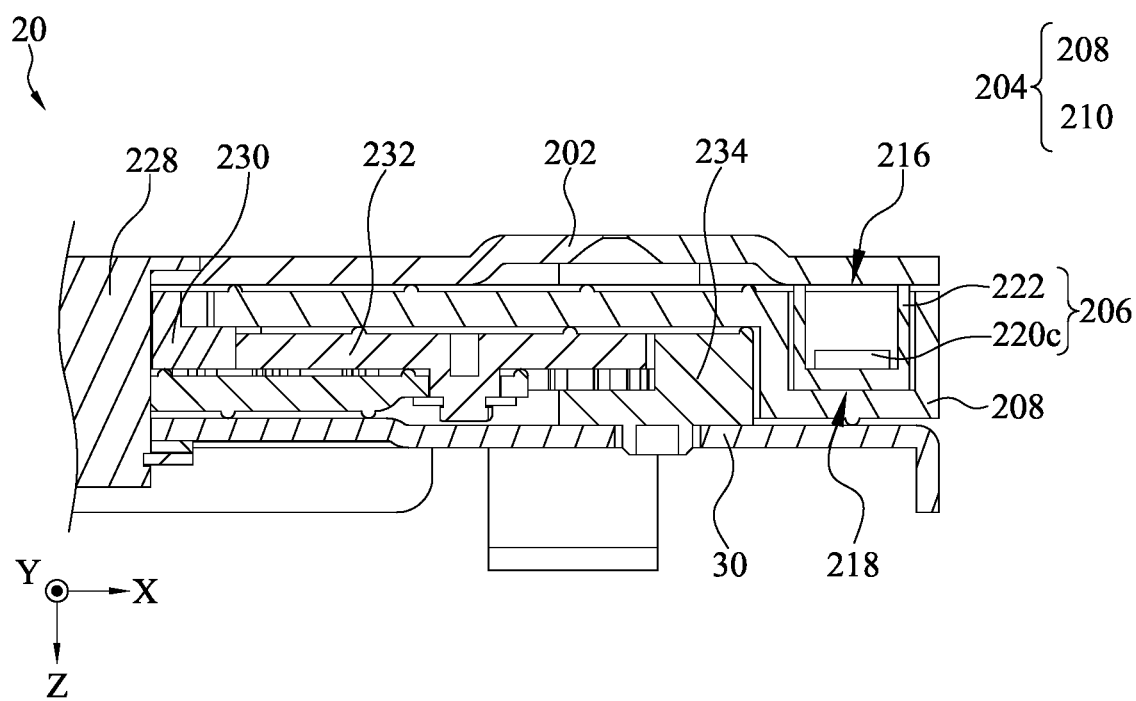
FIG. 8a is other embodiments of the FIG. 8, showing a friction assembly is fixed to a back plate.

Referring to FIG. 8 and FIG. 8a, FIG. 8 is a partial cross-sectional view corresponding to a position in FIG. 5 according to some embodiments of the present invention, showing an embodiment in which a force application member is a magnet. FIG. 8a is other embodiments of the FIG. 8, showing a friction assembly is fixed to a back plate. The monitor stand 10 is omitted in FIG. 8 and FIG. 8a, and the operation element 30 in FIG. 8 and FIG. 8a is a monitor assembly frame. In some embodiments, as shown in FIG. 5, FIG. 8, and FIG. 8a, the force application member 220 may be a magnet 220c, and a material of the back plate 202 or the input plate 208 may be a ferromagnetic material. In some embodiments, the friction assembly 206 is fixed to the input plate 208 by way of example in FIG. 8. The fixed surface 216 of the friction member 222 contacts the input plate 208, and the friction surface 218 contacts the back plate 202. The friction member 222 is axially fixed to the input plate 208 in such a way that the friction member 222 can be movably fixed in an axial direction (a Z axis in FIG. 8) of the speed reduction assembly 204. The magnet 220c is located between the input plate 208 and the friction member 222. When the magnet 220c assembles the friction assembly 206, the magnet 220c is attracted by the back plate 202 to push the friction member 222. The friction member 222 can move in the radial direction of the speed reduction assembly 204, and the magnet 220c can cause the friction surface 218 of the friction assembly 206 to abut against the back plate 202. In some embodiments, the friction assembly 206 is fixed to the back plate 202 by way of example in FIG. 8a. The fixed surface 216 of the friction member 222 contacts the back plate 202, and the friction surface 218 contacts the input plate 208. The friction member 222 is axially fixed to the back plate 202 in such a way that the friction member 222 can be movably fixed in an axial direction (a Z axis in FIG. 8) of the speed reduction assembly 204. The magnet 220c is located between the back plate 202 and the friction member 222. When the magnet 220c assembles the friction assembly 206, the magnet 220c is attracted by the input plate 208 to push the friction member 222. The friction member 222 can move in the radial direction of the speed reduction assembly 204, and the magnet 220c can cause the friction surface 218 of the friction assembly 206 to abut against the input plate 208.

Figure 9:
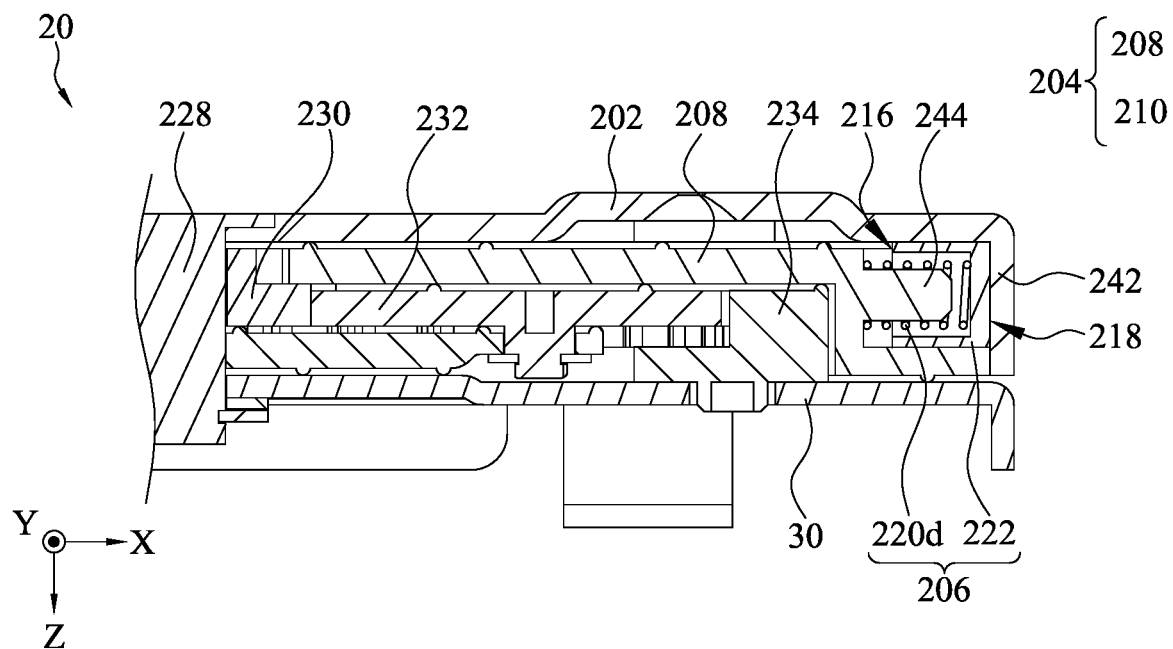
FIG. 9 is a partial cross-sectional view corresponding to a position in FIG. 5 according to some embodiments of the present invention, showing an embodiment in which a force application member is a spring that is radially arranged.
Figure 9A:
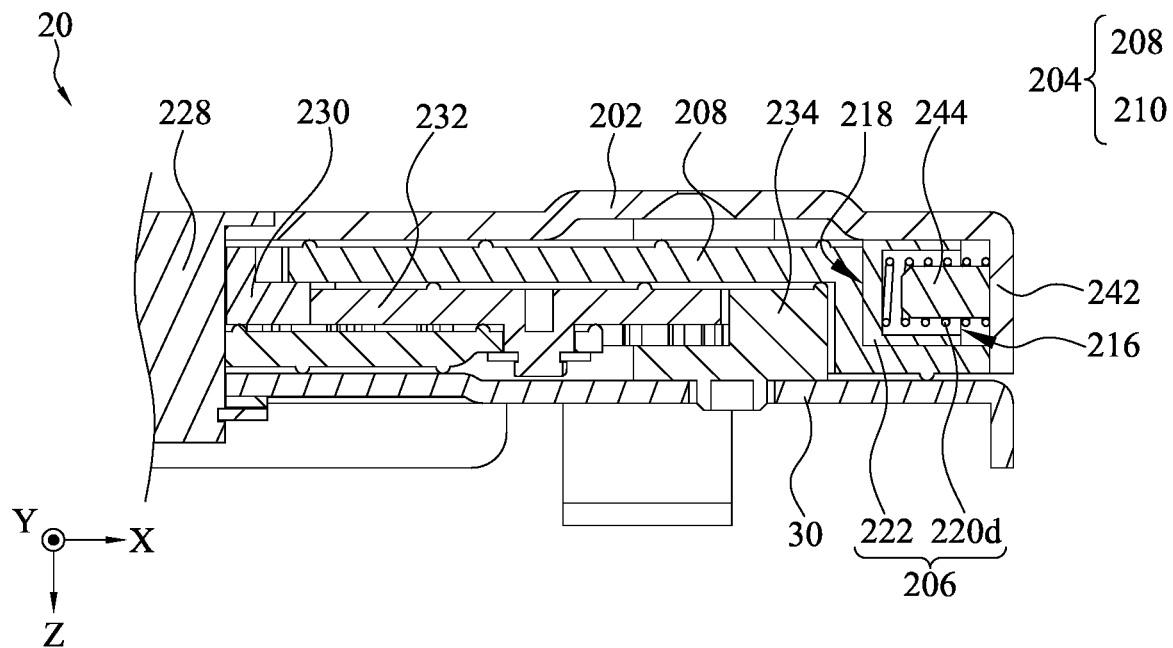
FIG. 9a is other embodiments of the FIG. 9, showing a friction assembly is fixed to a back plate.

Referring to FIG. 9 and FIG. 9a together, FIG. 9 is a partial cross-sectional view corresponding to a position in FIG. 5 according to some embodiments of the present invention, showing an embodiment in which a force application member is a spring that is radially arranged. FIG. 9a is other embodiments of the FIG. 9, showing a friction assembly is fixed to a back plate. The monitor stand 10 is omitted in FIG. 9 and FIG. 9, and the operation element 30 in FIG. 9 and FIG. 9 is a monitor assembly frame. In some embodiments, as shown in FIG. 5, FIG. 9, and FIG. 9a, the friction assembly 206 is radially located on an outer side of the speed reduction member 210. The force application member 220 may be a spring 220d arranged radially. The friction assembly 206 is fixed to the input plate 208 by way of example in FIG. 9. The back plate 202 has a side wall portion 242 extending axially (a Z axis in FIG. 9), and the input plate 208 has a positioning post 244 extending radially (an X axis in FIG. 9) to the side wall portion 242. The friction member 222 is radially fixed to the input plate 208 in such a way that the friction member 222 can be movably fixed in a radial direction of the speed reduction assembly 204. The spring 220d is located between the input plate 208 and the friction member 222 and sleeved on the positioning post 244, so that two ends of the spring 220d respectively contact the input plate 208 and the friction member 222. When the spring 220d assembles the friction assembly 206, the spring 220d is in a compressed state. The friction member 222 is movable in the radial direction of the speed reduction assembly 204, and the force application member 220 can cause the friction surface 218 of the friction assembly 206 to abut against the side wall portion 242 of the back plate 202. In some embodiments, as shown in FIG. 9a, the friction assembly 206 is fixed to the back plate 202 by way of example in FIG. 9a. The back plate 202 has a side wall portion 242 extending axially (a Z axis in FIG. 9a), and the input plate 208 has a positioning post 244 extending radially (an X-axial direction in FIG. 9a) to the side wall portion 242. The friction member 222 is radially fixed to the back plate 202 in such a way that the friction member 222 can be movably fixed in a radial direction of the speed reduction assembly 204. The spring 220d is located between the back plate 202 and the friction member 222 and sleeved on the positioning post 244, so that two ends of the spring 220d respectively contact the back plate 202 and the friction member 222. When the spring 220d assembles the friction assembly 206, the spring 220d is in a compressed state. The friction member 222 is movable in the radial direction of the speed reduction assembly 204, and the force application member 220 can cause the friction surface 218 of the friction assembly 206 to abut against the input plate 208. Therefore, the friction assembly 206 can shorten a gap between the back plate 202 and the input plate 208 through the radially arranged spring 220d, so that the friction assembly 206 can be designed to be thinner and lighter.

Figure 10:
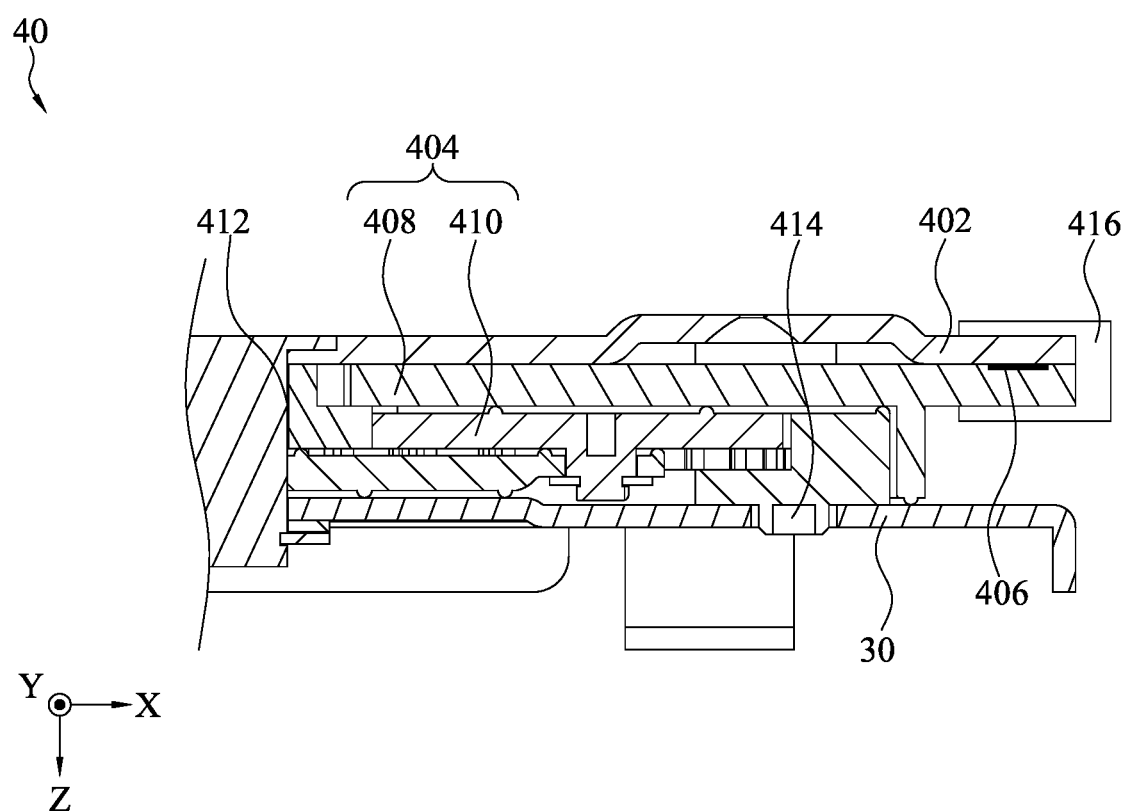
FIG. 10 is a partial cross-sectional view of another hinge mechanism corresponding to a position in FIG. 5 according to some embodiments of the present invention.

Referring to FIG. 10, FIG. 10 is a partial cross-sectional view of another hinge mechanism corresponding to a position in FIG. 5 according to some embodiments of the present invention. The monitor stand 10 is omitted in FIG. 10, and the operation element 30 in FIG. 10 is a monitor assembly frame. As shown in FIG. 10, in some embodiments, a hinge mechanism 40 is provided, including a back plate 402, a speed reduction assembly 404, and a friction assembly 406. The speed reduction assembly 404 includes an input plate 408 and a speed reduction member 410. The speed reduction member 410 has an input end 412 and an output end 414. The input plate 408 is arranged at the input end 412, and the input end 412 is pivotally connected to the back plate 402. The friction assembly 406 is arranged on one of the back plate 402 or the input plate 408, and the friction assembly 406 abuts against the other of the back plate 402 or the input plate 408. It should be noted that the friction assembly 406 may be, for example, a coating, a position where the back plate contacts the input plate, or a patch. In this embodiment, the back plate 402 and the speed reduction assembly 404 operate in the same manner as the above elements (see the back plate 202 and the speed reduction assembly 204 in FIG. 2). Refer to FIG. 1 to FIG. 5. The details are not described herein again. In this embodiment, the hinge mechanism 40 further includes a force application member 416. An end of the force application member 416 is fixed to one of the back plate 402 or the input plate 408, so that the force application member 416 can stably hold the back plate 402 and the input plate 408 when the input plate 408 rotates relative to the back plate 402. In this embodiment, the force application member 416 may be a holder.

Based on the above, in some embodiments, an electronic device is provided. When a user rotates a monitor, a speed reduction effect can be generated through the speed reduction member and the friction assembly of the hinge mechanism, and the torque between the friction assembly and the back plate can be amplified, so as to increase the sense of damping of the operation element (such as a monitor) during rotation. In addition, when the operation element stops rotating, the friction assembly may position the operation element, so that the electronic device can rotate and maintain the operation element at any angle. During the rotation of the operation element, the sense of damping generated by the hinge mechanism can improve the operation feel of rotation of the monitor.

Although the present invention has been described in considerable detail with reference to certain preferred embodiments thereof, the disclosure is not for limiting the scope of the invention. Persons having ordinary skill in the art may make various modifications and changes without departing from the scope and spirit of the invention. Therefore, the scope of the appended claims should not be limited to the description of the preferred embodiments described above.

What is claimed is:

1. An electronic device, comprising:
a monitor stand;
a hinge mechanism, comprising:
a back plate, fixed to the monitor stand;
a speed reduction assembly, comprising an input plate and a speed reduction member, wherein the speed reduction member is arranged on the input plate; and
a friction assembly, arranged between the back plate and the input plate; and
an operation element, connected to the speed reduction member, wherein a rotation center of the operation element coincides with an axis of the back plate and the speed reduction member are coaxially arranged;
wherein the friction assembly comprises a friction member and a force application member, the friction member has a fixed surface and a friction surface, the force application member is located between the input plate and the friction member, the force application member is a magnet, and the back plate is made of a ferromagnetic material, the friction surface abuts against the back plate.

2. The electronic device according to claim 1, wherein the speed reduction member has an input end and an output end, the input plate is fixed to the input end, the operation element is fixed to the output end, and the input end is pivotally connected to the back plate.

3. The electronic device according to claim 2, wherein a radial distance between the input end and a position where the friction assembly is fixed to one of the back plate and the input plate is greater than a radial distance between the input end and the output end.

4. The electronic device according to claim 3, wherein the friction assembly is radially located on an outer side of the speed reduction member.

5. The electronic device according to claim 4, wherein the fixed surface is fixed to the input plate, the friction surface abuts against the back plate, and the force application member is located between the input plate and the back plate, the friction surface abuts against the one of the back plate and the input plate.

6. A hinge mechanism, comprising:
a back plate;
a speed reduction assembly, comprising an input plate and a speed reduction member, wherein the speed reduction member has an input end and an output end, the input plate is fixed to the input end, and the input end is pivotally connected to the back plate; and
a friction assembly, having a fixed surface and a friction surface, wherein the fixed surface is fixed to one of the back plate and the input plate, and the friction surface abuts against the other of the back plate and the input plate, wherein
a radial distance between the input end and a position where the friction assembly is fixed to one of the back plate and the input plate is greater than a radial distance between the input end and the output end;

wherein the friction assembly comprises a friction member and a force application member, the friction member has a fixed surface and a friction surface, the force application member is an elastic element, one end of the elastic element contacts the friction member, and another end of the elastic element contacts one of the back plate and the input plate, the friction surface abuts against the other of the back plate and the input plate.

7. The hinge mechanism according to claim 6, wherein the speed reduction member is a planetary gear train and comprises a sun gear, a planetary gear set, and a ring gear, the planetary gear set meshes between the sun gear and the ring gear, the sun gear is connected to the input end, and the ring gear is connected to the output end.

8. The hinge mechanism according to claim 7, wherein the planetary gear set comprises a first gear, a second gear, and a third gear respectively mesh between the sun gear and the ring gear.

9. The hinge mechanism according to claim 8, wherein the friction assembly is radially located on an outer side of the speed reduction member.

10. The hinge mechanism according to claim 9, wherein the force application member is located between the input plate and the back plate, the friction surface abuts against the one of the back plate and the input plate.

11. The hinge mechanism according to claim 6, wherein the back plate is provided with a side wall portion that axially extends, the input plate is provided with a positioning post radially extending to the side wall portion, and the elastic element is sleeved on the positioning post.

12. A hinge mechanism, comprising:
a back plate;
a speed reduction assembly, comprising an input plate and a speed reduction member, wherein the speed reduction member has an input end and an output end, the input plate is arranged at the input end, and the input end is pivotally connected to the back plate; and
a friction assembly, arranged on one of the back plate or the input plate, wherein the friction assembly abuts against the other of the back plate or the input plate;
wherein the friction assembly comprises a friction member and a force application member, the friction member has a fixed surface and a friction surface, the force application member is an elastic element, one end of the elastic element contacts the friction member, and another end of the elastic element contacts one of the back plate and the input plate, the friction surface abuts against the other of the back plate and the input plate.

13. The hinge mechanism according to claim 12, wherein a radial distance between the input end and a position where the friction assembly is fixed to one of the back plate and the input plate is greater than a radial distance between the input end and the output end.

14. The hinge mechanism according to claim 13, wherein an end of the force application member is fixed to one of the back plate or the input plate, the force application member holds the back plate and the input plate.

15. The hinge mechanism according to claim 14, wherein the speed reduction member is a planetary gear train and comprises a sun gear, a planetary gear set, and a ring gear, the planetary gear set meshes between the sun gear and the ring gear, the sun gear is connected to the input end, and the ring gear is connected to the output end.

* * * * *